(12) United States Patent
Annen et al.

(10) Patent No.: US 11,528,348 B2
(45) Date of Patent: Dec. 13, 2022

(54) COMMUNICATION SYSTEM, COMMUNICATION DEVICE, COMMUNICATION METHOD, AND PROGRAM FOR RELIABLY RECEIVING PERIODIC DATA

(71) Applicant: Mitsubishi Electric Corporation, Tokyo (JP)

(72) Inventors: Katsuhiro Annen, Tokyo (JP); Daisuke Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/283,550

(22) PCT Filed: Nov. 19, 2018

(86) PCT No.: PCT/JP2018/042727
§ 371 (c)(1),
(2) Date: Apr. 8, 2021

(87) PCT Pub. No.: WO2020/105099
PCT Pub. Date: May 28, 2020

(65) Prior Publication Data
US 2021/0392209 A1 Dec. 16, 2021

(51) Int. Cl.
*H04L 69/22* (2022.01)
*H04L 5/00* (2006.01)
*H04L 67/147* (2022.01)

(52) U.S. Cl.
CPC ............ *H04L 69/22* (2013.01); *H04L 5/0048* (2013.01); *H04L 67/147* (2013.01)

(58) Field of Classification Search
None
See application file for complete search history.

(56) References Cited

U.S. PATENT DOCUMENTS 4,949,241 A * 8/1990 Iwasaki ............... G06F 9/3877 710/110
5,375,119 A * 12/1994 Koivu ................ H04L 49/9042 370/470

(Continued)

FOREIGN PATENT DOCUMENTS

| JP | 2000-29509 A | 1/2000 |
| JP | 2015-82271 A | 4/2015 |

OTHER PUBLICATIONS

International Search Report and Written Opinion dated Jan. 29, 2019, received for PCT Application PCT/JP2018/042727, Filed on Nov. 19, 2018, 9 pages including English Translation.

*Primary Examiner* — James A Edwards
(74) *Attorney, Agent, or Firm* — Xsensus LLP

(57) ABSTRACT

A communication system includes a master device and a slave device that perform, at predetermined periods, communication for sharing storage data stored in a cyclic memory. The master device transmits communication data that includes (i) identification information distinguishing a period relating to the communication data from other periods before and after the period and (ii) target information indicating whether the communication data is a target that is to be communicated by the communication at the predetermined periods or is an exception to be excluded from being the target. The slave device discards the received communication data when (i) the target information included in the received communication data indicates that the communication data is the target and (ii) a period indicated by the identification information included in the communication data is different from a current period, and processes the communication data.

15 Claims, 18 Drawing Sheets

(56) References Cited

U.S. PATENT DOCUMENTS

| | | | |
|---|---|---|---|
| 9,735,831 B1* | 8/2017 | Juntunen | H04J 3/0658 |
| 2010/0180006 A1* | 7/2010 | Nourbakhsh | G06F 13/1663 |
| | | | 709/213 |
| 2012/0131247 A1* | 5/2012 | Mok | G06F 13/4291 |
| | | | 710/110 |
| 2012/0185592 A1* | 7/2012 | Nakamura | H04L 12/4035 |
| | | | 709/224 |

* cited by examiner

COMMUNICATION SYSTEM, COMMUNICATION DEVICE, COMMUNICATION METHOD, AND PROGRAM FOR RELIABLY RECEIVING PERIODIC DATA

CROSS-REFERENCE TO RELATED APPLICATION

The present application is based on PCT filing PCT/JP2018/042727, filed Nov. 19, 2018, the entire contents of which are incorporated herein by reference.

TECHNICAL FIELD

The present disclosure relates to a communication system, a communication device, a communication method, and a program.

BACKGROUND ART

In a facility, such as a factory, a system for controlling multiple devices via a communication network is operated. Enablement of efficient cooperation among the multiple devices is desired for such a system, and in some cases, a so-called cyclic communication that allows each device to store common data in a memory thereof is employed. In cyclic communication, communication is executed periodically for sharing, with other devices, content of regions of the memory allocated for each of the devices.

In typical cyclic communication, each device sequentially communicates periodically to, within each period, synchronize data stored in the memories of the devices. In some cases, period information for identifying a period relating to data to be transmitted among the devices is included in the data (refer to, for example, Patent Literature 1).

Patent Literature 1 discloses a cyclic communication system in which multiple terminal devices perform cyclic communication via a network. According to this cyclic communication system, when cyclic communication data is transmitted after being divided into multiple data pieces, a counter value that is counted at each period for cyclic communication is added to each of the data pieces. A terminal device that receives the data pieces into which the data is divided refers to the counter values, thereby assuring synchronism for the multiple data pieces.

CITATION LIST

Patent Literature

Patent Literature 1: Unexamined Japanese Patent Application Publication No. 2015-82271

SUMMARY OF INVENTION

Technical Problem

In cyclic communication, communication for synchronization of data is to be performed within each period. In the case of a technique as disclosed in Patent Literature 1 in which data including period information is transmitted, checking by a device that receives the data a period indicated by the period information against a current period managed in the device is conceivable. If the periods match, the device determines the received data to be valid and processes the data, and in the case of disagreement in the periods, the device determines the received data to be invalid and discards the data. This allows a data transmitter and a data receiver to share data to be managed at each period, that is, data to be transmitted within each period.

However, in the case of a configuration that includes both a first device that communicates at a high speed and a second device that communicates at a low speed, communications from and to the second device may not be completed within each period. Specifically, when data to be transmitted in one period is not received within the one period and is received in a next period, the data might not be treat as a processing target and therefore storage in a memory in which the data is to be stored might not be performed. Thus, achievement of completion of communications within each period requires that the device communicating at a high speed operate at a slowed-down speed or that the device communicating at a low speed is replaced with a high-performance device. Employment of devices having different communication performances while taking full advantage of the communication performances cannot be achieved due to the above requirements, and thus there is a room for improvement in efficiency of a communication system.

The present disclosure is made in view of the aforementioned circumstances, and an objective of the present disclosure is to improve efficiency of a communication system.

Solution to Problem

To achieve the aforementioned objective, a communication system according to the present disclosure includes a first communication device and a second communication device that are to perform, at predetermined periods, communication for sharing storage data stored in storage means. The first communication device transmits communication data that includes (i) identification information distinguishing a period relating to the communication data from other periods before and after the period and (ii) target information indicating whether the communication data is a target that is to be communicated by the communication at the predetermined periods or is an exception to be excluded from being the target. The second communication device receives the communication data, and discards the communication data when (i) the target information included in the received communication data indicates that the communication data is the target and (ii) the period indicated by the identification information included in the communication data is different from a current period, and processes the communication data when the target information included in the communication data indicates that the communication data is the exception.

Advantageous Effects of Invention

According to the present disclosure, the second communication device receives communication data, discards the communication data when (i) the target information included in the received communication data indicates that the communication data is the target and (ii) a period indicated by the identification information included in the communication data is different from a current period, and processes the communication data when the target information included in the communication data indicates that the communication data is the exception. This enables employment of devices having different communication performances while taking full advantage of the communication performances, and thus can achieve improvement in efficiency of a communication system.

DESCRIPTION OF EMBODIMENTS

Hereinafter, a communication system 1000 according to an embodiment of the present disclosure is described in detail with reference to the drawings.

Embodiment

Figure 1:
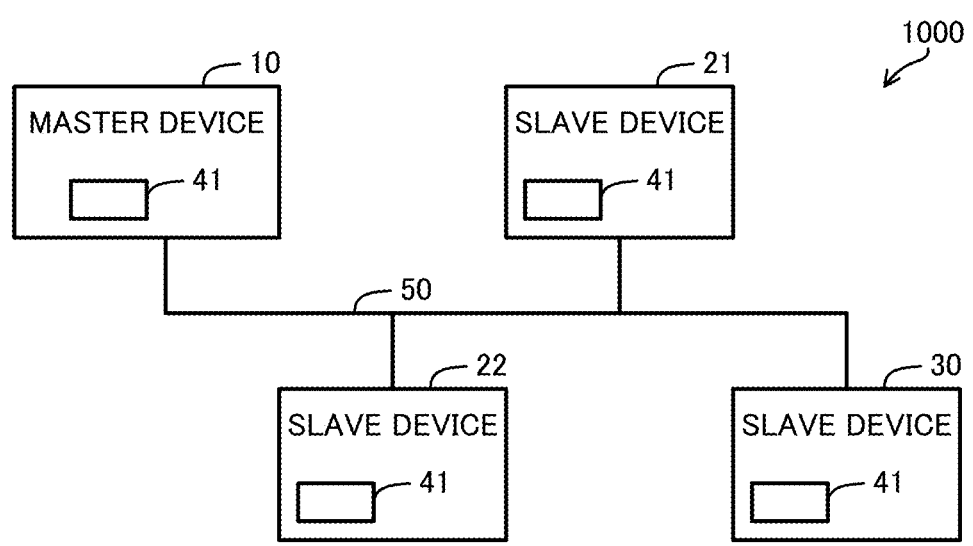
FIG. 1 illustrates configuration of a communication system according to an embodiment of the present disclosure.

The communication system 1000 according to the present embodiment is equivalent to a part of a factory automation (FA) system installed in a factory. The communication system 1000 is formed by connecting to one another, via a communication path, devices included in a system serving as an FA system, such as production system, an inspection system, a processing system or another system. As illustrated in FIG. 1, the communication system 1000 includes, as communication devices, a master device 10 and slave devices 21, 22, and 30.

Each of the master device 10 and the slave devices 21, 22, and 30 is, for example, a programmable logic controller (PLC), a device interfacing with a PLC, or an industrial personal computer (IPC). The master device 10 and the slave devices 21, 22, and 30 are connected to one another via a communication network 50. The communication network 50 is, for example, a field network formed by a network cable.

The master device 10 is equivalent to a master node of the communication system 1000, and each of the slave devices 21, 22, and 30 is equivalent to a slave node of the communication system 1000. The master device 10 transmits a control instruction to the slave devices 21, 22 and 30 via the communication network 50. Each of the slave devices 21, 22 and 30 controls, in accordance with the control instruction, a non-illustrated device connected thereto. This device is, for example, a sensor device, an actuator, or a robot.

Figure 2:
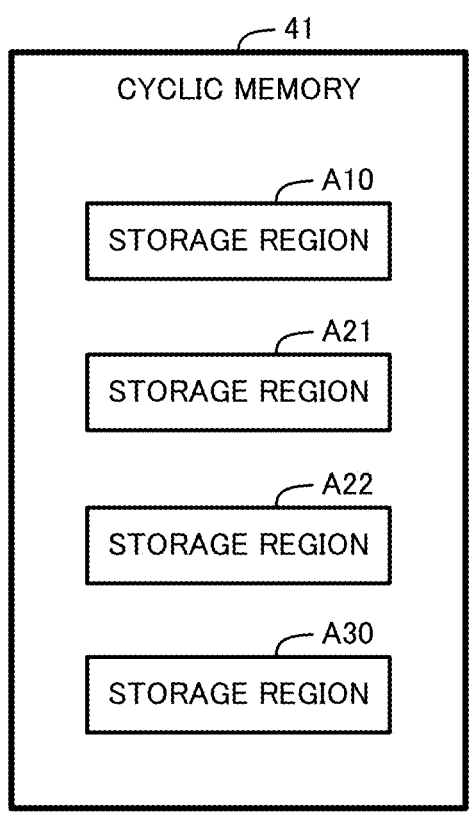
FIG. 2 illustrates a cyclic memory according to the embodiment.

Each of the master device 10 and the slave devices 21, 22, and 30 includes a cyclic memory 41 in which common data is stored. The cyclic memory 41 includes storage regions that each are allocated for a corresponding communication device of the communication devices. Specifically, the cyclic memory 41 includes a storage region A10 allocated for the master device 10, a storage region A21 allocated for the slave device 21, a storage region A22 allocated for the slave device 22, and a storage region A30 allocated for the slave device 30, as illustrated in FIG. 2. Each of these storage regions stores data to be updated by the communication device for which the storage region is allocated. For example, the storage region A10 stores data to be updated by the master device 10, and the data stored in the storage region A10 is not updated by the slave devices 21, 22 and 30. The cyclic memory 41 is an example of storage means for storing data to be shared among the master device 10 and the slave devices 21, 22 and 30. Hereinafter, the data stored in the cyclic memory 41 is referred to as the "storage data".

Figure 3:
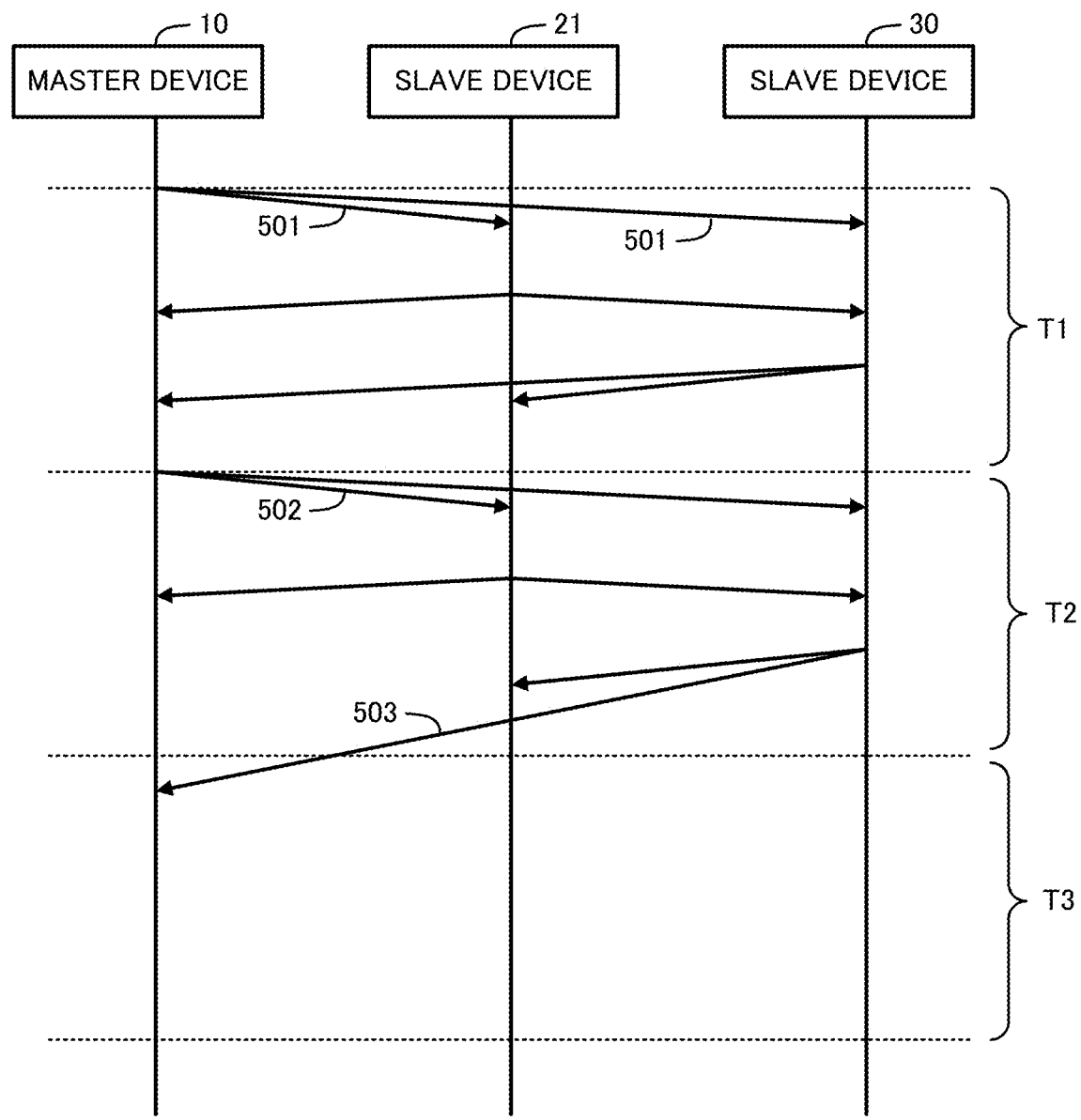
FIG. 3 illustrates communications performed at each period by communication devices according to the embodiment.

The master device 10 and the slave devices 21, 22 and 30 perform, at predetermined periods, cyclic communication for sharing the storage data stored in the cyclic memories 41. FIG. 3 illustrates an example of such communication. FIG. 3 illustrates the slave device 21 as a representative of the slave devices 21 and 22, and thus illustration of the slave device 22 is omitted.

As illustrated in FIG. 3, in period T1, each of the communication devices transmits communication data for updating content of the cyclic memory 41. For example, the arrows 501 indicate that the master device 10 transmits to the slave device 21 and 30 communication data including data for updating content of the storage region A10. Similarly, each of the slave devices 21 and 30 transmits, in the period T1, to the other communication devices, communication data for updating contents of the storage regions A21 and A30. The contents of the cyclic memories 41 are shared among all the communication devices by an ending time of the period T1.

Communication similar to that of the period T1 is also performed in the other periods T2 and T3. Each of the periods T1-T3 has, for example, a length of one microsecond or one millisecond. The periods T1, T2, and T3 may be periods stipulated by management of time by the multiple communication devices connected to a network time protocol (NTP) server, or may be periods that start upon each transmission of communication data by the master device 10. In the case where each of the periods T1, T2, and T3 starts upon transmission of communication data from the master device 10, the periods T1, T2, and T3 may have different lengths, or the slave devices 21 and 30 may determine a current period by measuring a time elapsed from a start time of a preceding period. In this case, communication in each period is completed by the slave devices 21 and 30 being triggered by the communication data transmitted from the master device 10 to make a relatively high-speed response and transmit communication data.

However, the slave device 30 is a device that communicates at a lower speed than speeds of the slave devices 21 and 22, and transmission of communication data from the slave device 30 may possibly not be completed within one period, as indicated by the arrow 503. Thus, communication devices according to the present embodiment, depending on content of communication data transmitted as described above, (i) treat the communication data as a target of the cyclic communication of which communication is to be completed within each period and discard the communication data or (ii) treat the communication data as an exception to the cyclic communication and utilize such for updating the cyclic memory 41.

The slave devices 21 and 22 communicate at a higher speed than a speed of the slave device 30 and, for example, are devices that execute software processing by a high-performance processor. However, the slave devices 21 and 22 may be hardware-implemented devices that use a dedicated communication circuit chip. The slave device 30 that communicates at a lower speed than speeds of the slave devices 21 and 22 is, for example, a device that executes software processing by a low-performance processor. The master device 10 performs the above-described cyclic communication with the slave devices 21 and 22 and performs, with the slave device 30, exception communication in which transmitted communication data is treated as the exception to the cyclic communication. However, in the case where the master device 10 itself is a device that communicates at a low speed, the master device 10 performs the exception communication with all the slave devices 21, 22, and 30.

Hereinafter, the master device 10 and the slave devices 21, 22, and 30 are collectively referred to as the communication devices 40.

Figure 4:
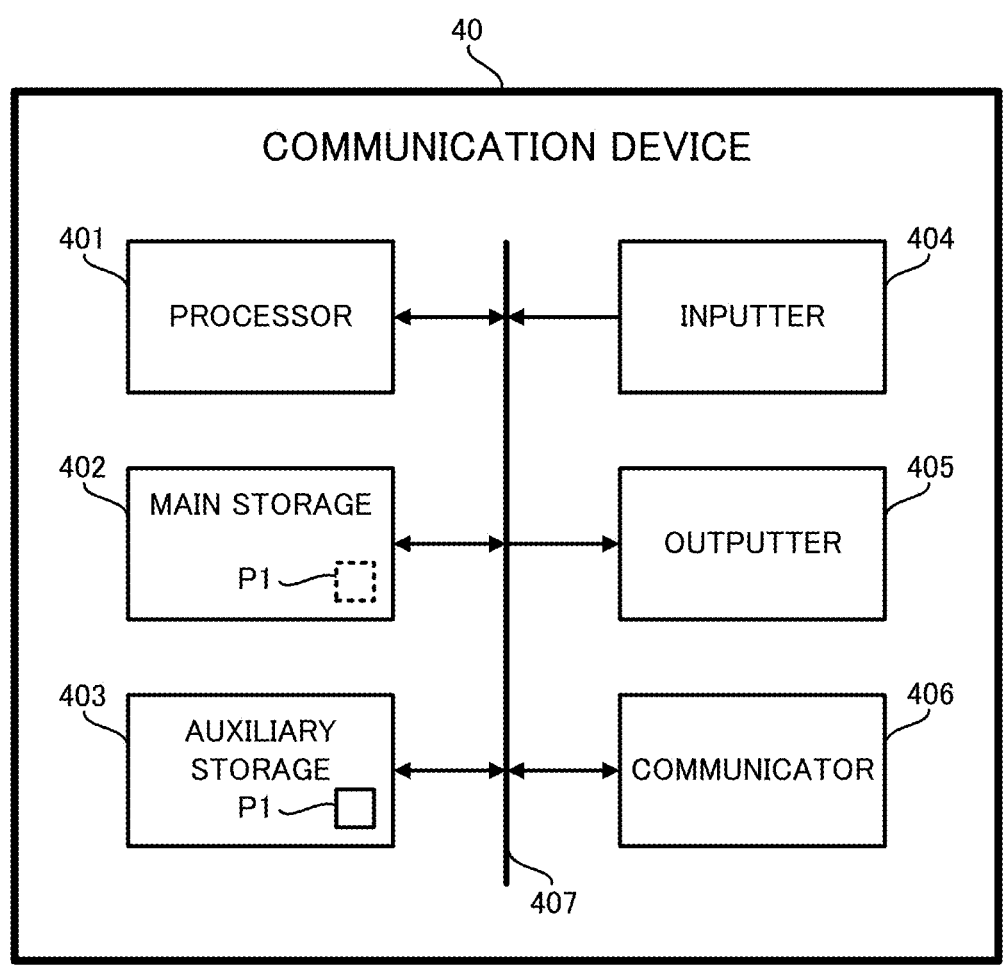
FIG. 4 illustrates hardware configuration of the communication device according to the embodiment.

As illustrated in FIG. 4, the communication device 40 includes, as hardware components, a processor 401, a main storage 402, an auxiliary storage 403, an inputter 404, an outputter 405, and a communicator 406. The main storage 402, the auxiliary storage 403, the inputter 404, the outputter 405, and the communicator 406 are connected to the processor 401 via an internal bus 407.

The processor 401 includes a central processing unit (CPU). The processor 401 executes a program P1 stored in the auxiliary storage 403 to achieve various types of functions of the communication device 40, thereby executing processing described later.

The main storage 402 includes random access memory (RAM). The program P1 is loaded from the auxiliary storage 403 into the main storage 402. The main storage 402 is used by the processor 401 as a work area.

The auxiliary storage 403 includes a nonvolatile memory such as an electrically erasable programmable read-only memory (EEPROM) and a hard disk drive (HDD). The auxiliary storage 403 stores the program P1 and various types of data used for processing by the processor 401. The auxiliary storage 403 supplies, in accordance with instructions from the processor 401, to the processor 401 data to be used by the processor 401 and stores data supplied from the processor 401.

The inputter 404 includes an input device such as input keys and a pointing device. The inputter 404 acquires information input by a user of the communication device 40 and sends notification of the acquired information to the processor 401.

The outputter 405 includes an output device such as a liquid crystal display (LCD) and a speaker. The outputter 405 presents various types of information to the user in accordance with instructions from the processor 401.

The communicator 406 includes a network interface circuit for communicating with an external device. The communicator 406 receives a signal from the exterior and outputs data indicated by the signal to the processor 401. Further, the communicator 406 transmits to the external device a signal indicating data output from the processor 401.

Figure 5:
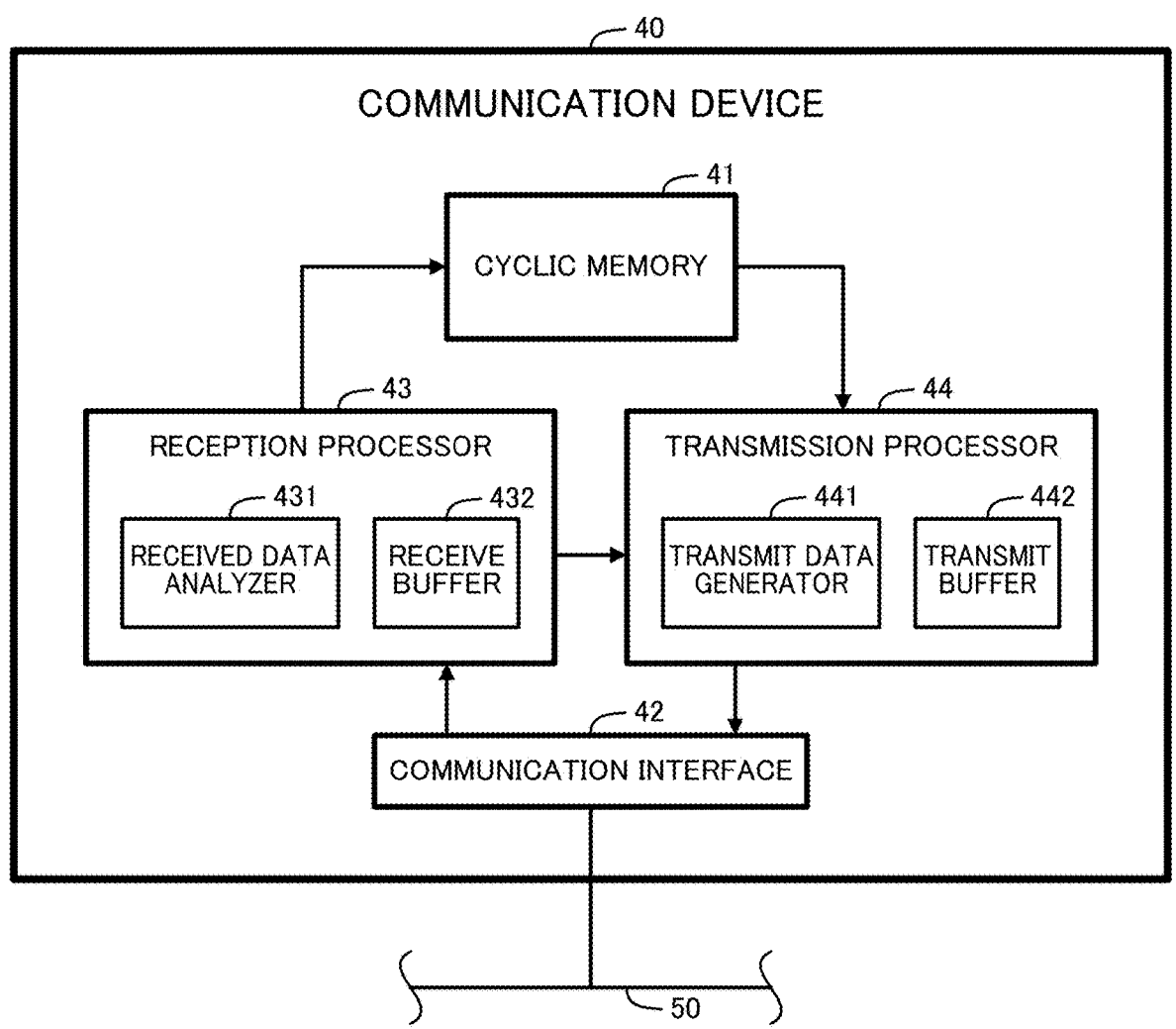
FIG. 5 illustrates functional configuration of the communication device according to the embodiment.

The communication device 40 achieves various functions by cooperation among the hardware components illustrated in FIG. 4. Specifically, as illustrated in FIG. 5, the communication device 40 functionally includes the cyclic memory 41, a communication interface 42 that transmits communication data to the communication network 50 and receives communication data from the communication network 50, a reception processor 43 that processes communication data received via the communication interface 42 and a transmission processor 44 that executes processing for transmitting communication data via the communication interface 42.

The cyclic memory 41 is mainly achieved by the main storage 402. However, such configuration is not limiting, and the cyclic memory 41 may be achieved by the auxiliary storage 403.

The communication interface 42 is achieved by the communicator 406. The communication interface 42 transmits communication data received from the communication network 50 to the reception processor 43 and transmits the communication data transmitted from the transmission processor 44 to the communication network 50.

The reception processor 43 is achieved in cooperation between the processor 401 and the main storage 402. The reception processor 43 is an example of processing means for discarding or processing received communication data. The reception processor 43 includes a received data analyzer 431 that analyzes received communication data and a receive buffer 432 that temporarily stores the received communication data. The received data analyzer 431 reads information included in the received communication data and determines whether the communication data is to be stored in the receive buffer 432. Communication data determined by the received data analyzer 431 to be for storage is stored in the receive buffer 432, whereas communication data determined not to be for storage is discarded. Storage data is extracted from the communication data stored in the receive buffer 432, and the extracted storage data is stored in the cyclic memory 41. Although an example in which the receive buffer 432 stores communication data is explained, the receive buffer 432 may store storage data extracted by the received data analyzer 431 from communication data.

The transmission processor 44 is achieved in cooperation between the processor 401 and the main storage 402. The transmission processor 44 includes a transmit data generator 441 that generates communication data and a transmit buffer 442 that temporarily stores communication data to be transmitted. The transmit data generator 441 determines, based on a result of analysis by the received data analyzer 431, or by a determination made by the transmit data generator 441 itself, whether the communication data to be transmitted is the target of the cyclic communication or the exception to the cyclic communication. Then, the transmit data generator 441 generates communication data including content of this determination and the storage data read from the cyclic memory 41 and stores this communication data in the transmit buffer 442. The communication data stored in the transmit buffer 442 is, at a time controlled by the transmission processor 44, transmitted to the communication network 50 via the communication interface 42. Although an example in which the transmit buffer 442 stores communication data is explained, the transmit buffer 442 may store storage data read from the cyclic memory 41, and the transmit data generator 441 may read the storage data from the transmit buffer 442 to generate communication data.

Figure 6:
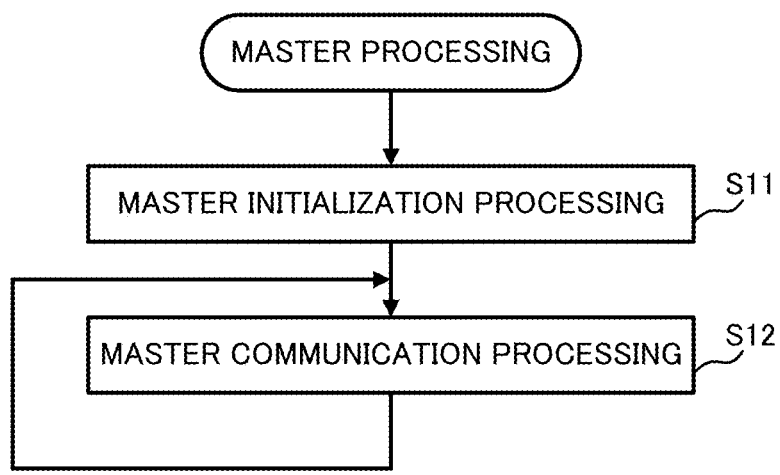
FIG. 6 is a flowchart of master processing according to the embodiment.
Figure 7:
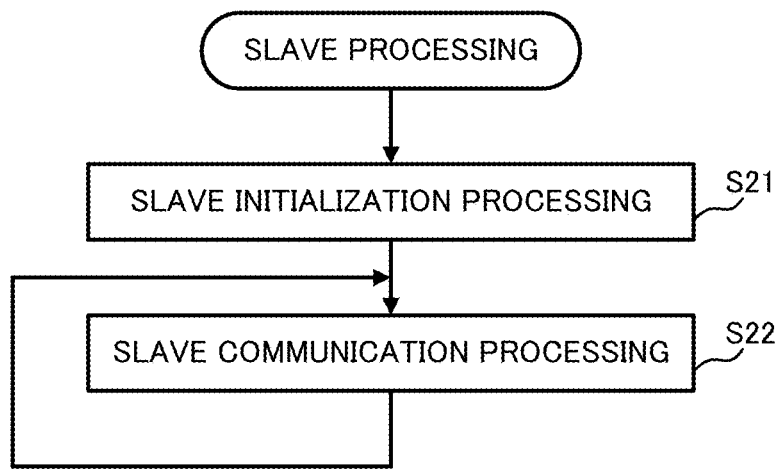
FIG. 7 is a flowchart of slave processing according to the embodiment.

Next, communication processing executed by a plurality of the communication devices 40 is explained with reference to FIGS. 6-15. The master device 10 executes master processing as illustrated in FIG. 6, and the slave devices 21, 22, and 30 execute slave processing as illustrated in FIG. 7. Such processing starts due to powering up of the communication devices 40 to enable communications therebetween via the communication network 50.

In the master processing illustrated in FIG. 6, the master device 10 executes master initialization processing (step S11). The master initialization processing is processing executed by the master device 10 in an initialization phase of the communication system 1000 and is processing that sets whether the master device 10 is to perform the cyclic communication or is to perform the exception communication. Then, the master device 10 executes master communication processing (step S12). The master communication processing is processing for communicating, in accordance with the setting performed in the master initialization processing, with the slave devices 21, 22, and 30 at each period. The master initialization processing and the master communication processing are described later in detail.

For the slave processing illustrated in FIG. 7, a case where the slave processing is executed by the slave device 30 is explained as an example, although the devices 21 and 22 execute the slave processing similar to that executed by the slave device 30. In the slave processing, the slave device 30 executes slave initialization processing (step S21). The slave initialization processing is processing executed by the slave device 30 in the initialization phase of the communication system 1000 and is processing that sets whether the slave device 30 is to perform the cyclic communication or is to perform the exception communication. The slave initialization processing is executed in parallel with the master initialization processing. Then the slave device 30 executes slave communication processing (step S22). The slave communication processing is processing for communicating, in accordance with the setting performed in the slave initialization processing, with the master device 10 and the slave devices 21 and 22 at each period. The slave initialization processing and the slave communication processing are described later in detail.

Figure 8:
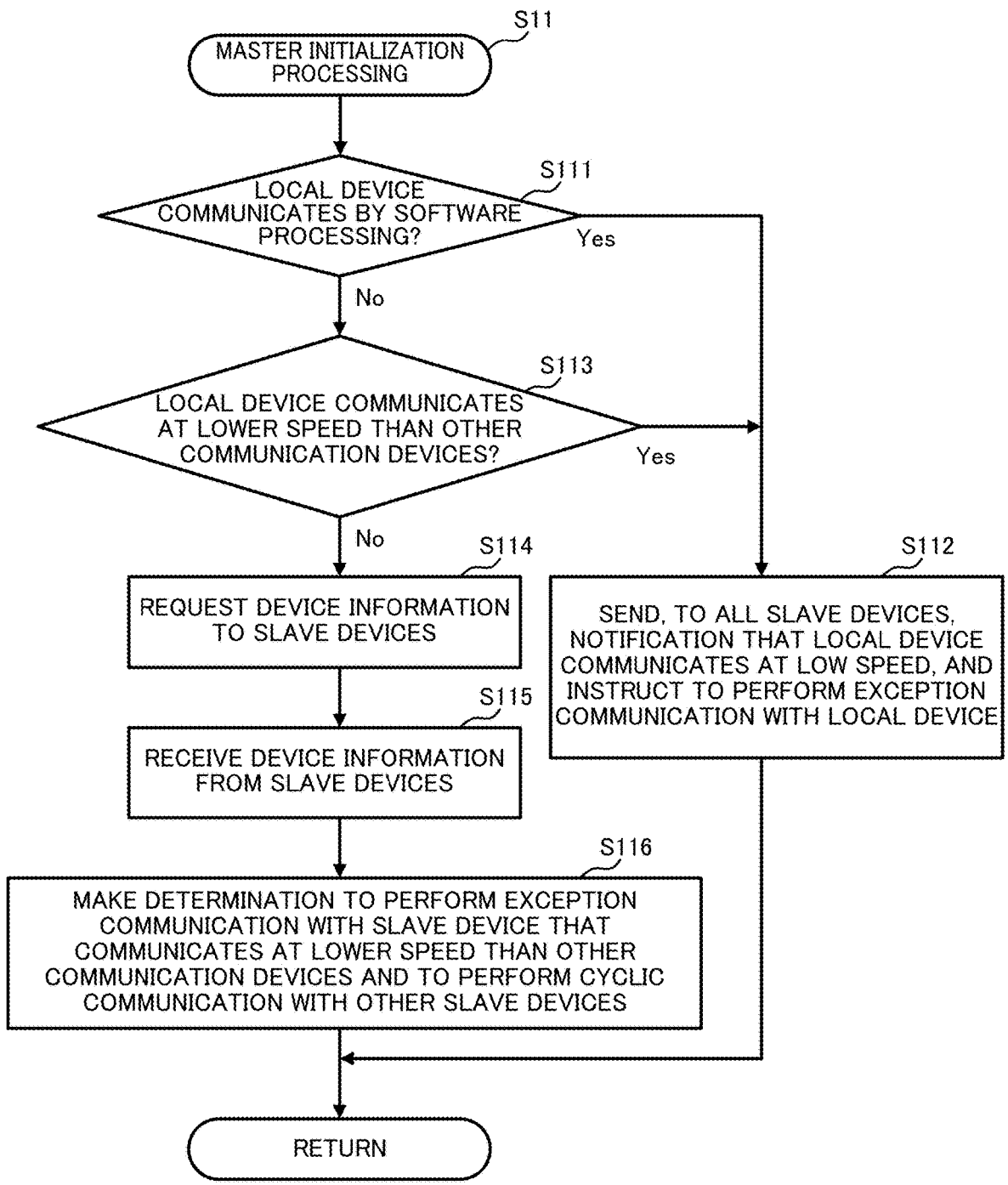
FIG. 8 is a flowchart of master initialization processing according to the embodiment.

Next, the master initialization processing and the slave initialization processing are explained in order. In the master initialization processing, as illustrated in FIG. 8, the master device 10 determines whether the local device communicates by software processing (step S111). Specifically, the transmission processor 44 of the master device 10 determines whether communication for sharing the storage data with the other communication devices 40 is to be accompanied by software processing by the local device. Software processing takes a longer time to complete than hardware processing, and thus communication by software processing can be said to be low-speed communication.

However, in the case where the master device 10 includes a high-performance processor 401, communication accompanied by software processing can be high-speed communication. Thus, a positive determination may be made in step S111 on condition that, in addition to the condition that the communication is to be accompanied by software processing, the master device 10 includes a predetermined type of processor 401. Further, even if the communication is accompanied by software processing, a negative determination may be made in step S111 in the case of inclusion of a predetermined type of processor 401. Moreover, a positive determination may be made in step S111 on condition that, in addition to the condition that the communication is accompanied by software processing, computational load of such software processing is somewhat heavy. Whether the computation load is heavy may be determined based on a determination of whether a source code has a size exceeding a threshold value, or may be determined based on a determination of whether a time taken to execute in the past exceeds a threshold value.

When a determination is made that the local (master) device communicates by software processing (YES in step S111), the master device 10 sends, to all the slave devices, notification that the local device communicates at a low speed, and instructs to perform the exception communication with the local device (step S112). Specifically, the transmission processor 44 generates a frame 60 in a format as in the example illustrated in FIG. 9. This frame 60 includes a header part 61, a data part 62, and a footer part 63. The header part 61 includes a destination address 611 indicating a communication device 40 that is a destination of the frame 60, a transmission source address 612 indicating a communication device 40 that is a transmission source of the frame 60, and frame type information 613 indicating a type of the frame 60. The data part 62 includes instruction information 621 indicating instruction for the slave devices 21, 22 and 30 as to whether to perform the exception communication. The instruction information 621 is, for example, a 1-bit flag. When a value of this flag is zero, each slave device is not instructed to perform the exception communication, and thus may perform the cyclic communication or perform the exception communication depending on the communication performance thereof. When the value of this flag is one, notification that the master device 10 communicates at a low speed is sent, and all the slave devices are instructed to perform the exception communication.

Again with reference to FIG. 8, after step S112, processing executed by the master device 10 returns from the master initialization processing to the master processing illustrated in FIG. 6.

Conversely, when a determination is made that the local (master) device is not a device that communicates by software processing (NO in step S111), the master device 10 determines whether the local device communicates at a lower speed than speeds of the other communication devices 40 (step S113). Specifically, the transmission processor 44 determines whether the auxiliary storage 403 of the master device 10 stores a parameter indicating that the master device 10 is a device that communicates at a low speed. This parameter may be set before shipment of the master device 10 or may be set by the user in advance. Further, the master device 10 may query the other communication devices 40 with respect to communication performances and make a comparison with the communication performance of the local (master) device in order to make the determination in step S113.

Figure 9:
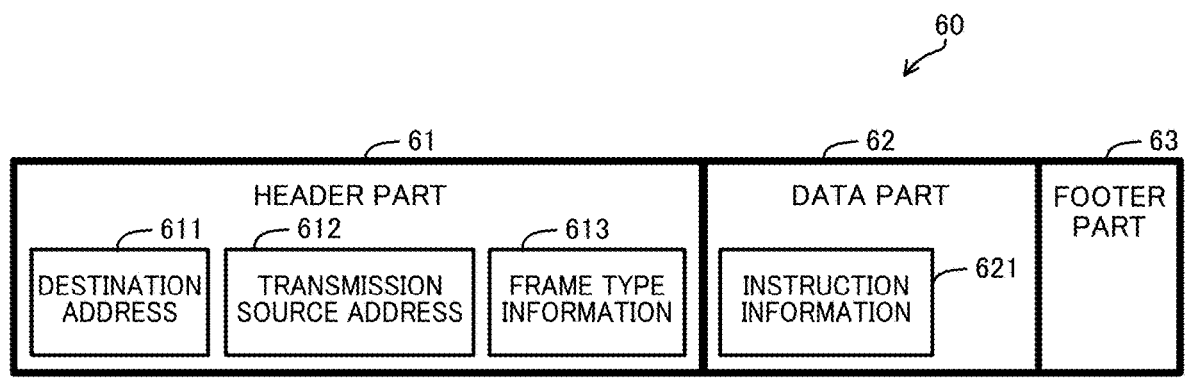
FIG. 9 illustrates a format of a frame transmitted in the master initialization processing according to the embodiment.

When a determination is made that the local (master) device communicates at a lower speed than the speeds of the other communication devices 40 (YES in step S113), the master device 10 shifts the processing to step S112. Conversely, when a determination is made that the local (master) device is not a device that communicates at a lower speed than the speeds of the other communication devices 40 (NO in step S113), the master device 10 requests, to each slave device, device information relating to the slave devices 21, 22 and 30 (step S114). Specifically, the transmission processor 44 generates, for each of the slave devices 21, 22 and 30, a frame for inquiring whether communication is at a low speed or communication is at a high speed. This frame may be in a format as illustrated in FIG. 9. In the case of generation of the frame in the format illustrated in FIG. 9, this frame includes the instruction information 621 indicating instruction not to perform the exception communication. The generated frames are transmitted to the slave devices 21, 22, and 30 via the communication interface 42.

Then the master device 10 receives the device information from the slave devices 21, 22, and 30 (step S115). Specifically, the reception processor 43 receives, via the communication interface 42, responses from the slave devices 21, 22, and 30 with respect to the requests made in step S114. This allows the master device 10 to determine whether each of the slave devices 21, 22 and 30 is a device that communicates at a low speed or a device that communicates at a high speed.

Then the master device 10 makes a determination to perform the exception communication with a slave device that communicates at a lower speed than speeds of the other communication devices 40 and to perform the cyclic communication with the other slave devices. Specifically, the reception processor 43 sends, to the transmission processor 44, notification of the device information received in step S115. Thus, the transmission processor 44 generates, for the slave devices 21 and 22 that communicate at a high speed, frames for the cyclic communication and generates, for the slave device 30 that communicates at a low speed, a frame for the exception communication. Thereafter, the processing by the master device 10 returns from the master initialization processing to the master processing illustrated in FIG. 6.

In the slave initialization processing executed by the slave device 30 simultaneously with the master initialization processing described above, as illustrated in FIG. 10, the slave device 30 determine whether the instruction to perform the exception communication is received from the master device 10 (step S211). Specifically, the reception processor 43 of the slave device 30 determines whether the instruction in step S112 of FIG. 8 is received via the communication interface 42.

When a determination is made that the instruction to perform the exception communication is received from the master device 10 (YES in step S211), the slave device 30 makes a determination to perform the exception communication (step S212). This leads to inclusion of, in communication data generated by the transmission processor 44 of the slave device 30, information indicating that the communication data is to be treated as the exception to the cyclic communication. Thereafter, the processing executed by the slave device 30 returns from the slave initialization processing to the slave processing illustrated in FIG. 7.

Conversely, when a determination is made that the instruction to perform the exception communication is not received from the master device 10 (NO in step S211), the slave device 30 determines whether the request from the master device 10 for the device information is made (step S213). Specifically, the reception processor 43 of the slave device 30 determines whether data indicating the request made in step S114 of FIG. 8 is received via the communication interface.

When a determination is made that the request for the device information is not made (NO in step S213), the slave device 30 repeats the determination of step S213 and waits until the request for the device information is made. Conversely, when a determination is made that the request for the device information is made (YES in step S213), the slave device 30 determines whether the local (slave) device communicates by software processing (step S214). This determination is made by processing similar to the processing for making the determination in step S111 of the master initialization processing of FIG. 8.

When a determination is made that the local (slave) device communicates by software processing (YES in step S214), the slave device 30 makes a determination to perform the exception communication and transmits, as a response to the master device 10, the device information indicating that the local device communicates at a low speed (step S215). Specifically, the transmission processor 44 of the slave device 30 generates, and transmits via the communication interface 42, a frame 60 in a format as in the example illustrated in FIG. 11. The data part 62 of this frame 60 includes device information 622 indicating that the slave device 30 itself communicates at a low speed. The device information 622 is, for example, a 1-bit flag. This flag indicates, when a value thereof is zero, communication at a low speed, or indicates when the value thereof is one, communication at a high speed. Again with reference to FIG. 10, after step S215, the processing executed by the slave device 30 returns from the slave initialization processing to the slave processing illustrated in FIG. 7.

Conversely, when a determination is made that the local (slave) device is not a device that communicates by software processing (NO in step S214), the slave device 30 determines whether the local device communicates at a lower speed than speeds of the other communication devices 40 (step S216). This determination is made by processing similar to the processing to make the determination in step S113 of the master initialization processing of FIG. 8.

Figure 11:
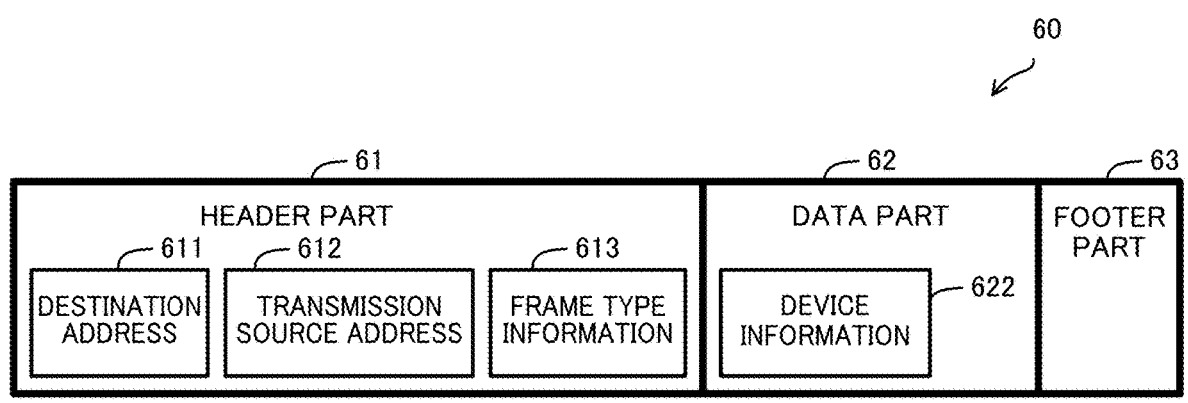
FIG. 11 illustrates a format of a frame transmitted in the slave initialization processing according to the embodiment.

When a determination is made that the local (slave) device communicates at a lower speed than the speeds of the other communication devices 40 (YES in step S216), the slave device 30 shifts the processing to step S215. Conversely, when a determination is made that the local (slave) device is not a device that communicates at a lower speed than the speeds of the other communication devices 40 (NO in step S216), the slave device 30 makes a determination to perform the cyclic communication and transmits, as a response to the master device 10, the device information indicating that the local device communicates at a high speed (step S217). Specifically, the transmission processor 44 of the slave device 30 generates, and transmits via the communication interface 42, a frame 60 in a format as illustrated in FIG. 11. The data part 62 of this frame 60 includes device information 622 indicating that the slave device 30 itself communicates at a high speed. Thereafter, the processing executed by the slave device 30 returns from the slave initialization processing to the slave processing illustrated in FIG. 7.

By execution of the master initialization processing and the slave initialization processing, a determination is made for each communication device 40 as to whether to perform the cyclic communication or to perform the exception communication. Specifically, the slave device 30 that communicates at a low speed and the master device 10 that is a main communication partner of the slave device 30 perform the exception communication, and the master device 10 and the other slave devices, that is, the slave devices 21 and 22, perform the cyclic communication. In the case where the master device 10 communicates at a low speed, the exception communication is performed between the master device 10 and all the slave devices 21, 22, and 30. Communication devices 40 that perform the exception communication transmit communication data that includes information indicating that the communication data is to be treated as a target of the exception communication, whereas communication devices 40 that perform the cyclic communication transmit communication data that includes information indicating that the communication data is to be treated as the target of the cyclic communication.

Figure 12:
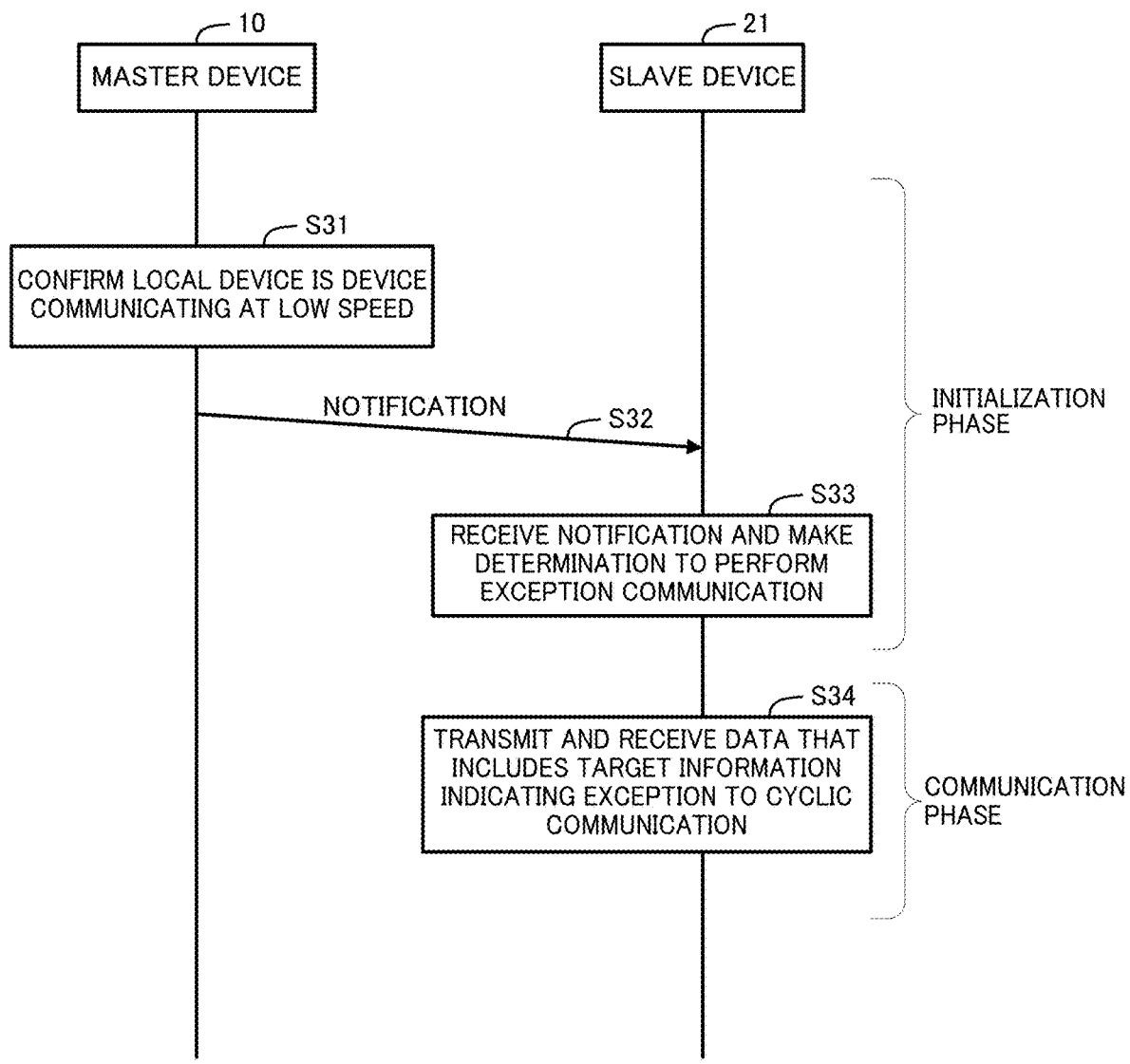
FIG. 12 is a first diagram illustrating an example of communication processing according to the embodiment.

For example, in the case where the master device 10 is a device that communicates at a low speed, the master device 10 and all the slave devices perform the exception communication, as illustrated in FIG. 12. Specifically, as illustrated in FIG. 12, the master device 10 confirms that the local device is a device that communicates at a low speed (step S31). This step S31 corresponds to a positive determination in step S111 and a positive determination in step S113 of the master initialization processing that are illustrated in FIG. 8.

Then the master device 10 sends, to the slave devices 21, 22 and 30, notification that the master device 10 itself communicates at a low speed (step S32). FIG. 12 illustrates only the slave device 21 as a representative of the slave devices 21, 22, and 30. This step S32 corresponds to step S112 of the master initialization processing illustrated in FIG. 8.

Then the slave device 21 receives the notification sent in step S32 and makes a determination to perform the exception communication (step S33). This step S33 corresponds to step S212 of the slave initialization processing illustrated in FIG. 10. Thereafter, the slave device 21 transmits and receives, in a communication phase of the communication system 1000, between the master device 10, communication data that includes target information indicating that the communication data is the exception to the cyclic communication. This communication phase is described later in detail.

Figure 10:
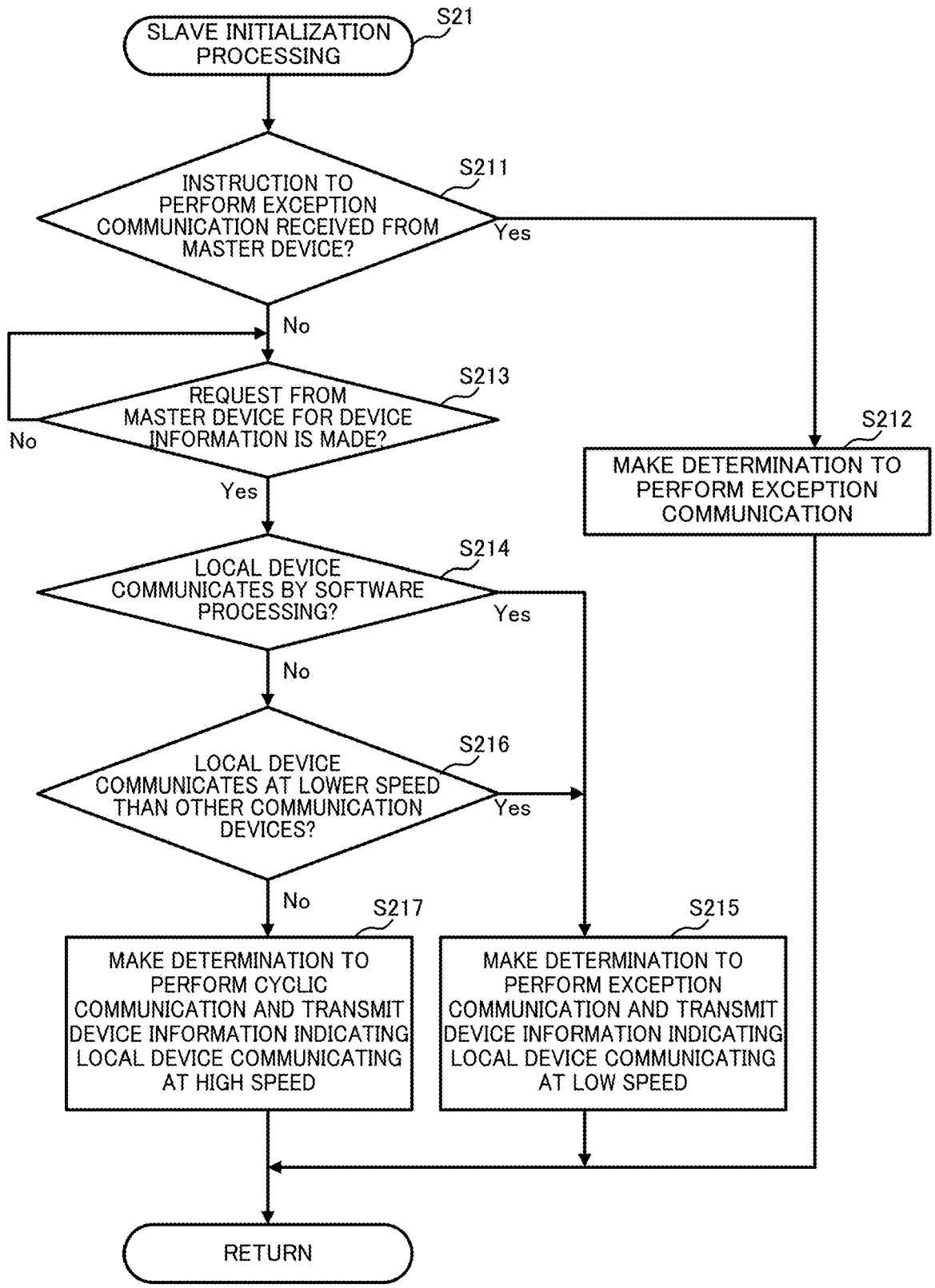
FIG. 10 is a flowchart of slave initialization processing according to the embodiment.
Figure 13:
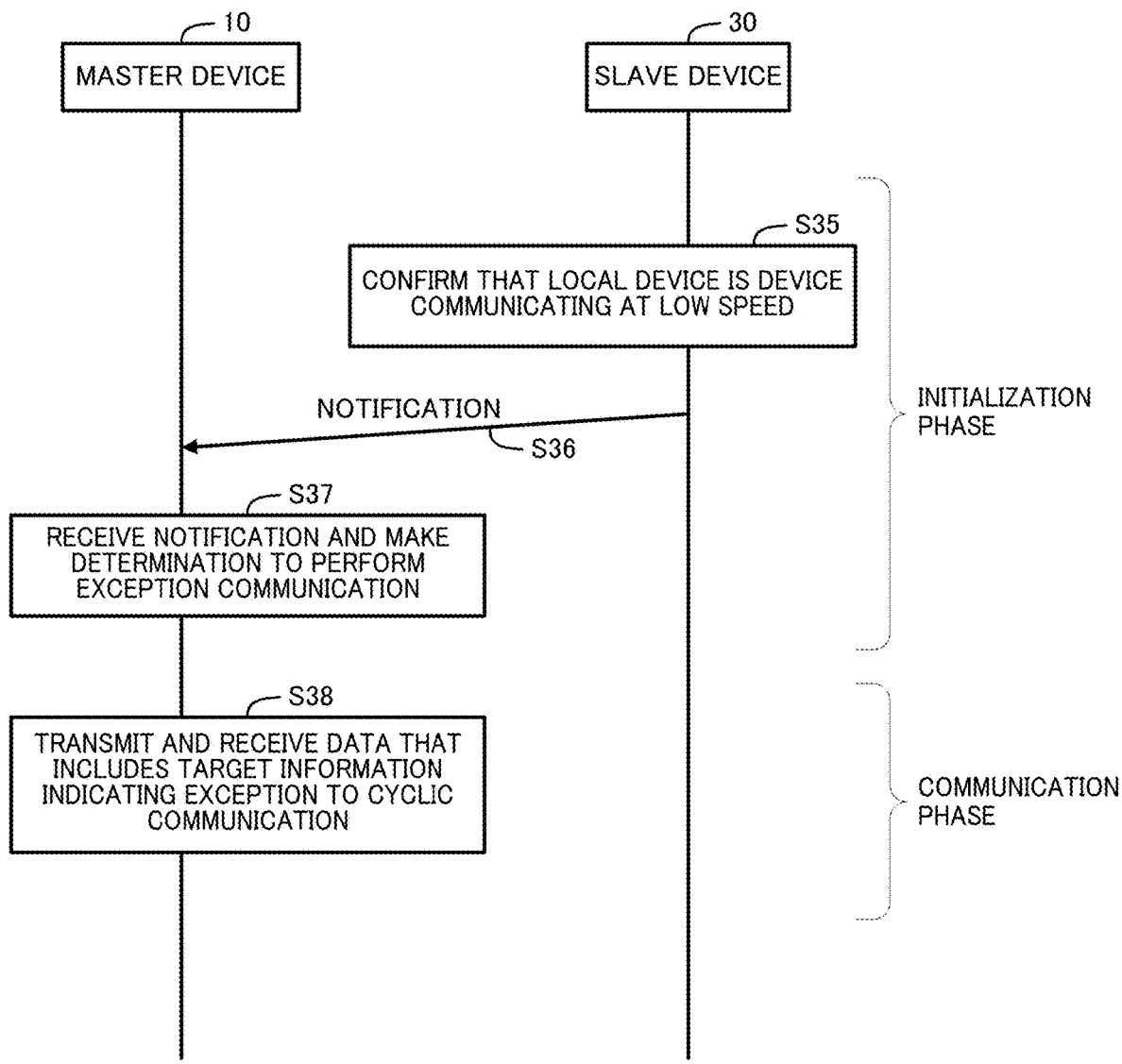
FIG. 13 is a second diagram illustrating another example of the communication processing according to the embodiment.

In the case where the master device 10 is a device that communicates at a high speed and the slave device 30 is a device that communicates at a low speed, as illustrated in FIG. 13, the slave device 30 confirms that the local device is a device that communicates at a low speed (step S35). This step S35 corresponds to a positive determination in step S214 and a positive determination in step S216 of the slave initialization processing that are illustrated in FIG. 10.

Then the slave device 30 sends to the master device 10 notification that the slave device 30 itself communicates at a low speed (step S36). This step S36 corresponds to step S215 of the slave initialization processing illustrated in FIG. 10.

Then the master device 10 receives the notification sent in step S36 and makes a determination to perform the exception communication with the slave device 30 (step S37). This step S37 corresponds to step S116 of the master initialization processing illustrated in FIG. 8. Thereafter, the master device 10 transmits and receives, in the communication phase of the communication system 1000, between the slave device 30, communication data that includes target information indicating that the communication data is the exception to the cyclic communication.

Figure 14:
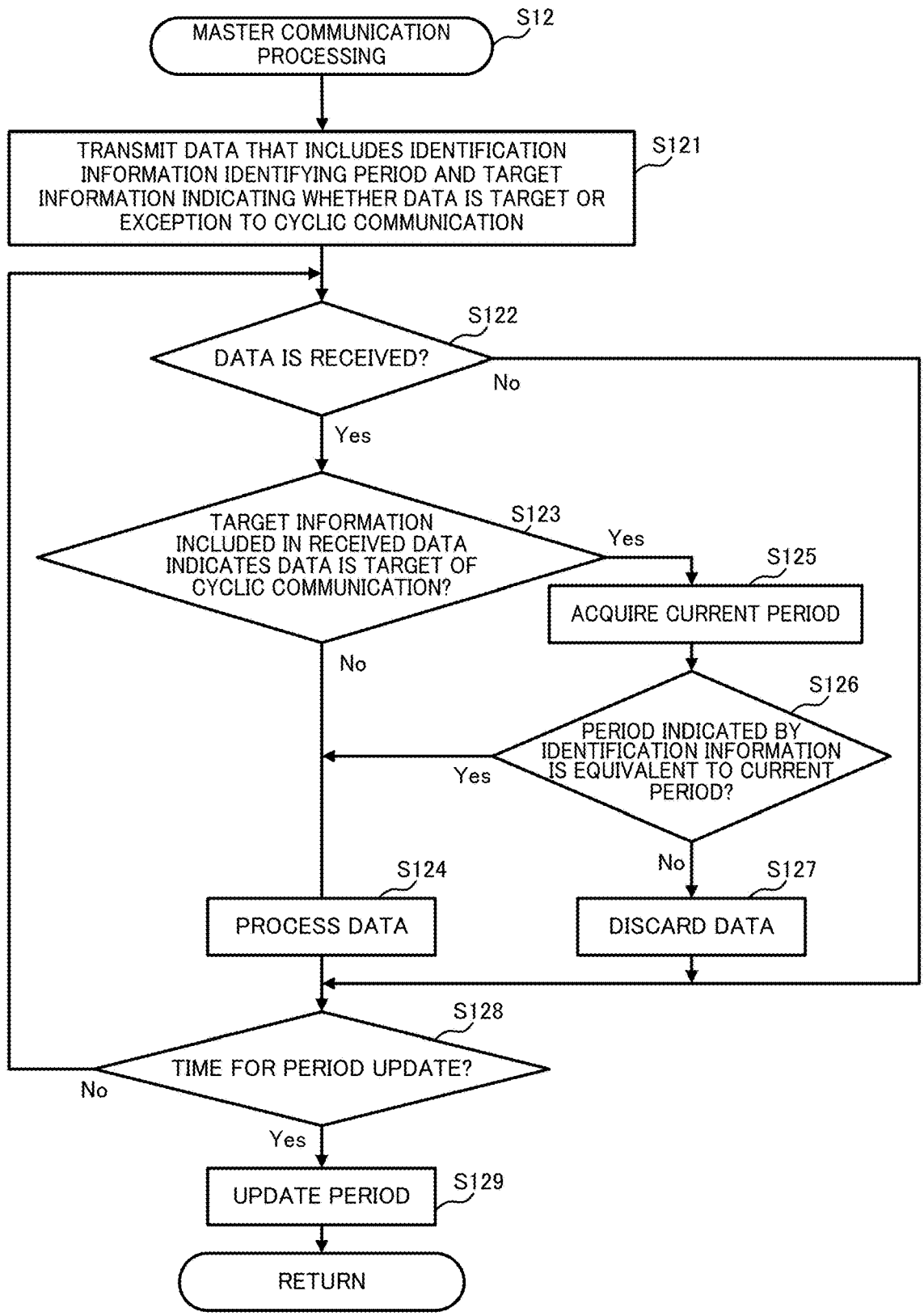
FIG. 14 is a flowchart of master communication processing according to the embodiment.

Next, the master communication processing executed by the master device 10 in the communication phase of the communication system 1000 is explained with reference to FIGS. 14 and 15. In this master communication processing, the master device 10 includes in communication data to be transmitted (i) identification information identifying a period relating to the communication data and (ii) target information indicating whether the communication data is the target of, or the exception to, the cyclic communication, and transmits the communication data to the slave devices 21, 22, and 30 (step S121).

Figure 15:
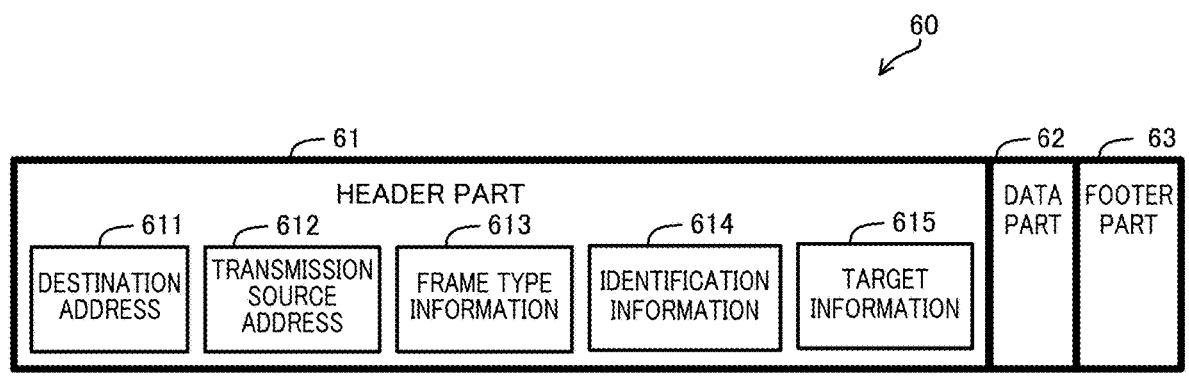
FIG. 15 illustrates a format of a frame transmitted in the master communication processing according to the embodiment.

Specifically, the transmission processor 44 of the master device 10 generates a frame 60 in a format as in the example of FIG. 15 and transmits the frame via the communication interface 42. The header part 61 of this frame 60 includes, in addition to the destination address 611, the transmission source address 612, and the frame type information 613, identification information 614 to distinguish a period from other periods before and after the period and target information 615 indicating that this frame 60 is the target of the cyclic communication or is the exception to the cyclic communication that is to be excluded from being the target of the cyclic communication. The data part 62 of this frame 60 stores storage data for updating the cyclic memory 41.

The identification information 614 is, for example, 7-bit data, and a period indicated by the identification information 614 is, for example, a number of a period including a time at which the master device 10 transmits the frame 60. This number is a sequential numerical value and is incremented upon every period update. However, the period indicated by the identification information 614 is not limited to this example and may be freely modified.

The target information 615 is, for example, a 1-bit flag. This flag indicates, when a value thereof is zero, that the frame 60 is the target of the cyclic communication, or indicates, when the value thereof is one, that the frame 60 is the exception to the cyclic communication and is the target of the exception communication.

Again with reference to FIG. 14, the master device 10 determines whether communication data is received (step S122). Specifically, the reception processor 43 determines whether communication data is received from the other communication devices 40 via the communication interface 42.

When a determination is made that communication data is not received (NO in step S122), the master device 10 shifts the processing to step S128. Conversely, when a determination is made that communication data is received (YES in step S122), the master device 10 determines whether target information included in the received communication data indicates that the communication data is the target of the cyclic communication (step S123).

When a determination is made that the target information does not indicate the target of the cyclic communication (NO in step S123), the master device 10 determines that the received communication data is the target of the exception communication and processes this communication data (step S124). Specifically, the master device 10 processes the received communication data regardless of a period indicated by the identification information of the communication data. More specifically, the reception processor 43 stores the communication data in the receive buffer 432. Thus, when the target information included in communication data indicates that the communication data is the exception to the cyclic communication, the reception processor 43 processes the communication data.

Conversely, when a determination is made that the target information indicates the target of the cyclic communication (YES in step S123), the master device 10 acquires a current period managed by the local (master) device (step S125). Specifically, the reception processor 43 reads data stored in the main storage 402 and indicating the current period.

Then the master device 10 determines whether the period indicated by the identification information included in the received communication data is equivalent to the current period acquired in step S125 (step S126). When a determination is made that the periods are equivalent (YES in step S126), the master device 10 shifts the processing to step S124. Conversely, when a determination is made that the periods are not equivalent (NO in step S126), the master device 10 discards the received communication data (step S127). Thus, when communication data that is the target of the cyclic communication is received in a period that is different from a period indicated by the communication data, the communication data is discarded. That is to say, the reception processor 43 discards communication data when (i) the target information included in the communication data indicates that the communication data is the target of the cyclic communication and (ii) a period indicated by the identification information included in the communication data is different from the current period.

After completion of step S124 or step S127, or when a negative determination is made in step S122, the master device 10 determines whether the current time is after a time for period update (step S128).

When a determination is made that the current time is not after the time for period update (NO in step S128), the master device 10 executes the processing of step S122 and beyond. Conversely, when a determination is made that the current time is after the time for period update (YES in step S128), the master device 10 updates the period (step S129). Specifically, the master device 10 updates the current period managed by the local device. Thereafter, the processing by the master device 10 returns from the master communication processing illustrated in FIG. 14 to the master processing illustrated in FIG. 6.

In the communication phase of the communication system 1000, the slave communication processing as illustrated in FIG. 7 is executed in parallel with the master communication processing described above. The slave communication processing is similar to the master communication processing illustrated in FIG. 14. In the slave communication processing, however, transmission of data corresponding to step S121 may be performed at a time of update of a period managed by the slave device 30 itself or may be triggered by the receipt of data from the master device 10. Further, communication data that leads to the determination "data is received" in a process corresponding to step S122 is communication data from the master device 10 and communication data from the other slave devices.

As described above, when one of the master device 10 and the slave devices 21, 22, and 30 is taken to be a first communication device that transmits communication data and another device is taken to be a second communication device that receives communication data, the second communication device discards the received communication data when (i) target information included in the communication data indicates that the communication data is the target of the cyclic communication and (ii) a period indicated by identification information included in the communication data is different from a current period. Further, when target information included in communication data indicates that the communication data is the exception to the cyclic communication, the second communication device processes the communication data. This enables employment of devices having different communication performances while taking full advantage of the communication performances, and thus can achieve improvement in efficiency of a communication system.

Specifically, for the communication devices 40 that each are the master device 10, the slave device 21, the slave device 22, or the slave device 30, the determination as to whether the communication data is the target of the cyclic communication or the exception to the cyclic communication is made depending on whether the communication data is transmitted from or received by a device that communicates at a low speed. Thus, in the case where the master device 10 and the slave device 21 communicate at a high speed whereas the slave device 30 communicates at a low speed, the cyclic communication is performed between the master device 10 and the slave device 21 whereas the exception communication is performed between the master device 10 and the slave device 30.

Figure 16:
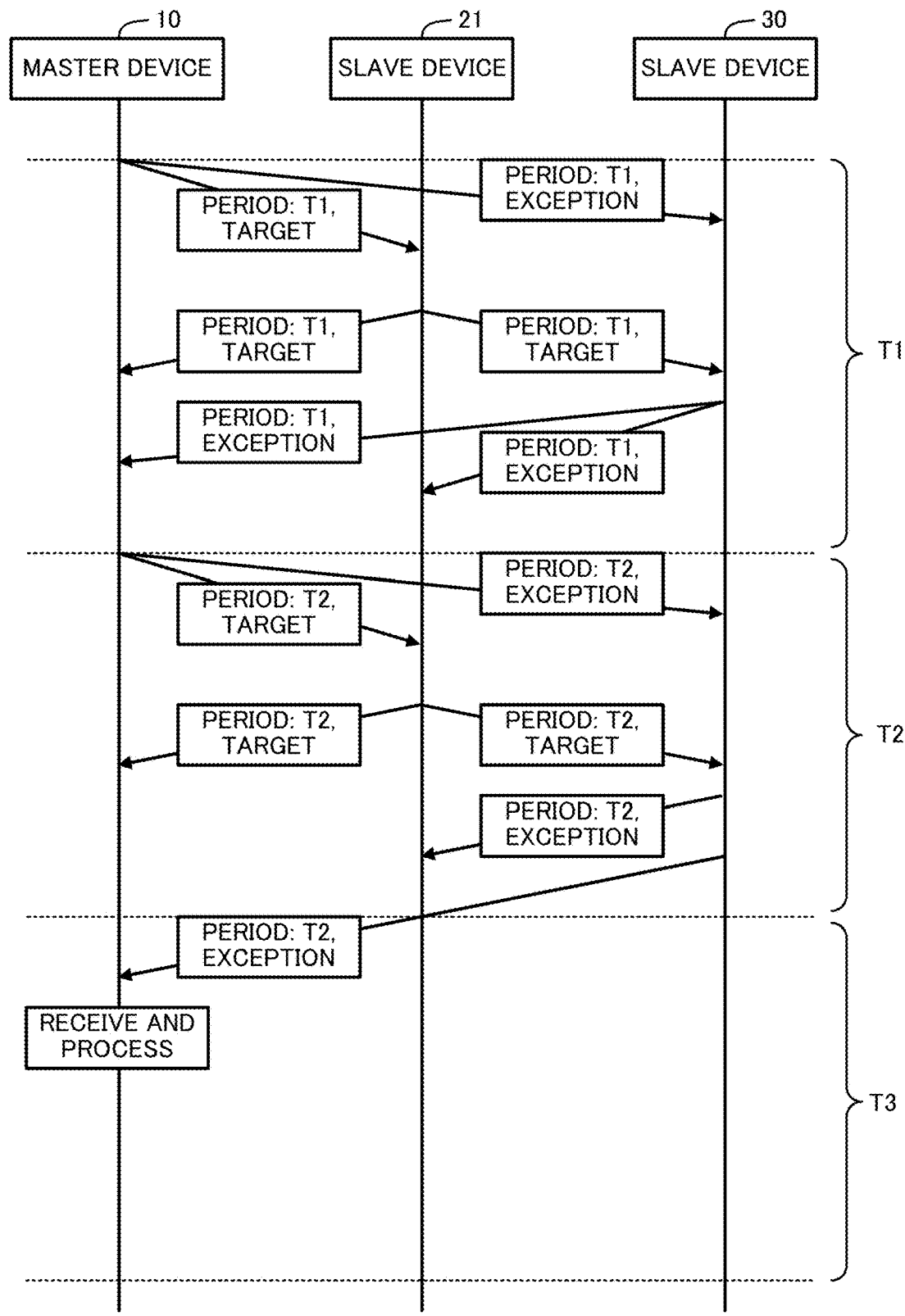
FIG. 16 is a third diagram illustrating still another example of the communication processing according to the embodiment.

FIG. 16 illustrates example transmissions of data in such case with contents of the identification information 614 and the target information 615 thereof. The slave device 30 is a low-speed device, and data transmitted from the slave device 30 in period T2 may thus be received by the master device 10 in period T3, as illustrated in FIG. 16. The master device 10 can, without discarding such data, receive and process such data. This enables employment of communication devices 40 having different communication performances while taking full advantage of the communication performances thereof.

Figure 17:
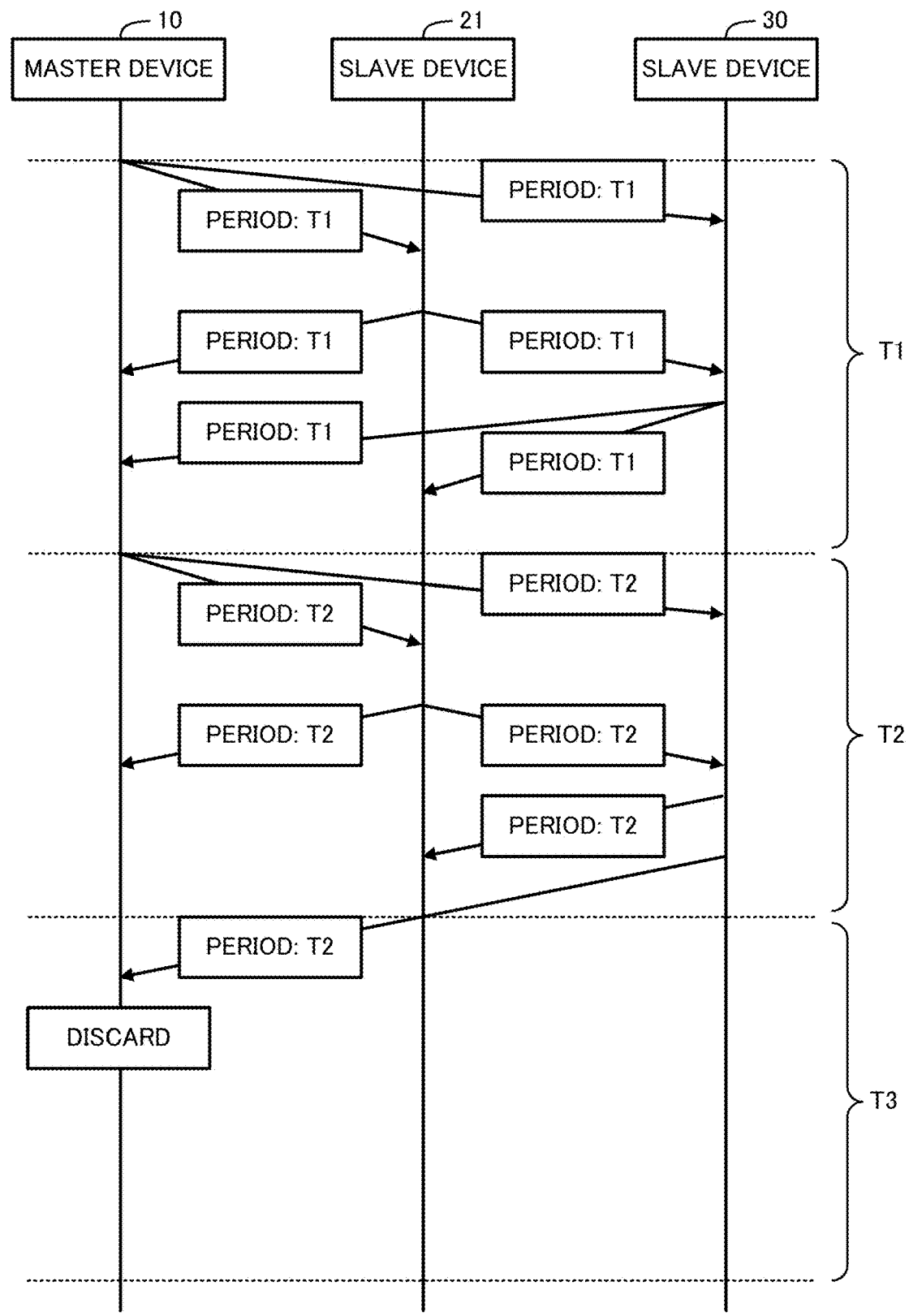
FIG. 17 illustrates an example of communication processing according to a comparative example.

FIG. 17 illustrates a comparative example in which all the communication devices 40 perform the cyclic communication. In this example, data transmitted in period T2 from the slave device 30 that communicates at a low speed is discarded when received by the master device 10 in period T3, resulting in failure to transmit information from the slave device 30 to the master device 10 and to share the content in the cyclic memory 41 between the master device 10 and the slave device 30. This may cause inconvenience in operation of the factory automation (FA) system that includes the communication system 1000. In the communication system 1000 according to the present embodiment, the master device 10 receives and processes data from the slave device 30, and thus can avoid occurrence of the above-described inconvenience.

Furthermore, the target information indicating whether communication data is the target of the cyclic communication is stored in the header part of the frame that is the communication data. Thus, the communication device 40 having received communication data can, even before receiving the data part of the communication data, determine merely by checking the heater part whether the communication data is the target of the cyclic communication.

Although performing the exception communication leads to failure to guarantee sharing among all the communication devices 40 within each period, appropriate operation may be performed by taking into consideration that such a guarantee is not given to a device that communicates at a low speed.

Furthermore, the first communication device that transmits communication data transmits, in the case where the local device is a device that communicates by software processing, communication data that includes target information indicating that the communication data is the exception to the cyclic communication. This allows communication data transmitted by the first communication device that communicates at a low speed to be treated as the target of the exception communication, and thus communication data that is appropriate for the exception communication can be treated as the target of the exception communication.

Furthermore, the first communication device that transmits communication data transmits, in the case communication at lower speed than speeds of the other devices, communication data that includes target information indicating that the communication data is the exception to the cyclic communication. This allows communication data transmitted by the first communication device that communicates at a low speed to be treated as the target of the exception communication, and thus communication data that is appropriate for the exception communication can be treated as the target of the exception communication.

Furthermore, the first communication device that transmits communication data transmits communication data that includes target information indicating that the communication data is the exception to the cyclic communication, in response to notification from the second device that is a destination of the communication data. Specifically, the slave devices 21, 22, and 30 receive the notification sent in step S112 of FIG. 8 and perform the exception communication. Additionally, the master device 10 receives, as notification indicating that the slave devices 21, 22, and 30 are low-speed devices, device information as illustrated in step S115 of FIG. 8 and performs the exception communication. This allows a communication partner of a communication device 40 that is a low-speed device to perform mutual exception communication with the communication device 40. A device that communicates at a low speed may not be able to control transmission timing and may not be able to receive and process all communication data transmitted in a period at high speed. Thus, performing the exception communication by the communication partner of the communication device 40 that is a low-speed device is desirable.

Although an embodiment of the present disclosure is described above, the present disclosure is not limited to the above-described embodiment.

For example, a number of the communication devices 40 is not limited to the number illustrated in the example of FIG. 1 and may be freely changed.

Furthermore, although an example is described in which a 1-bit flag is used to send notification that the first communication device is a low-speed device, this is not limiting. For example, the first communication device may receive notification that the second communication device communicates by software processing and perform the exception communication in response to this notification. The second communication device may send, to the first communication device, notification that the local device communicates by software communication. Such notification is achieved by, for example, a pattern expressed by a code of at least 2 bits.

Figure 18:
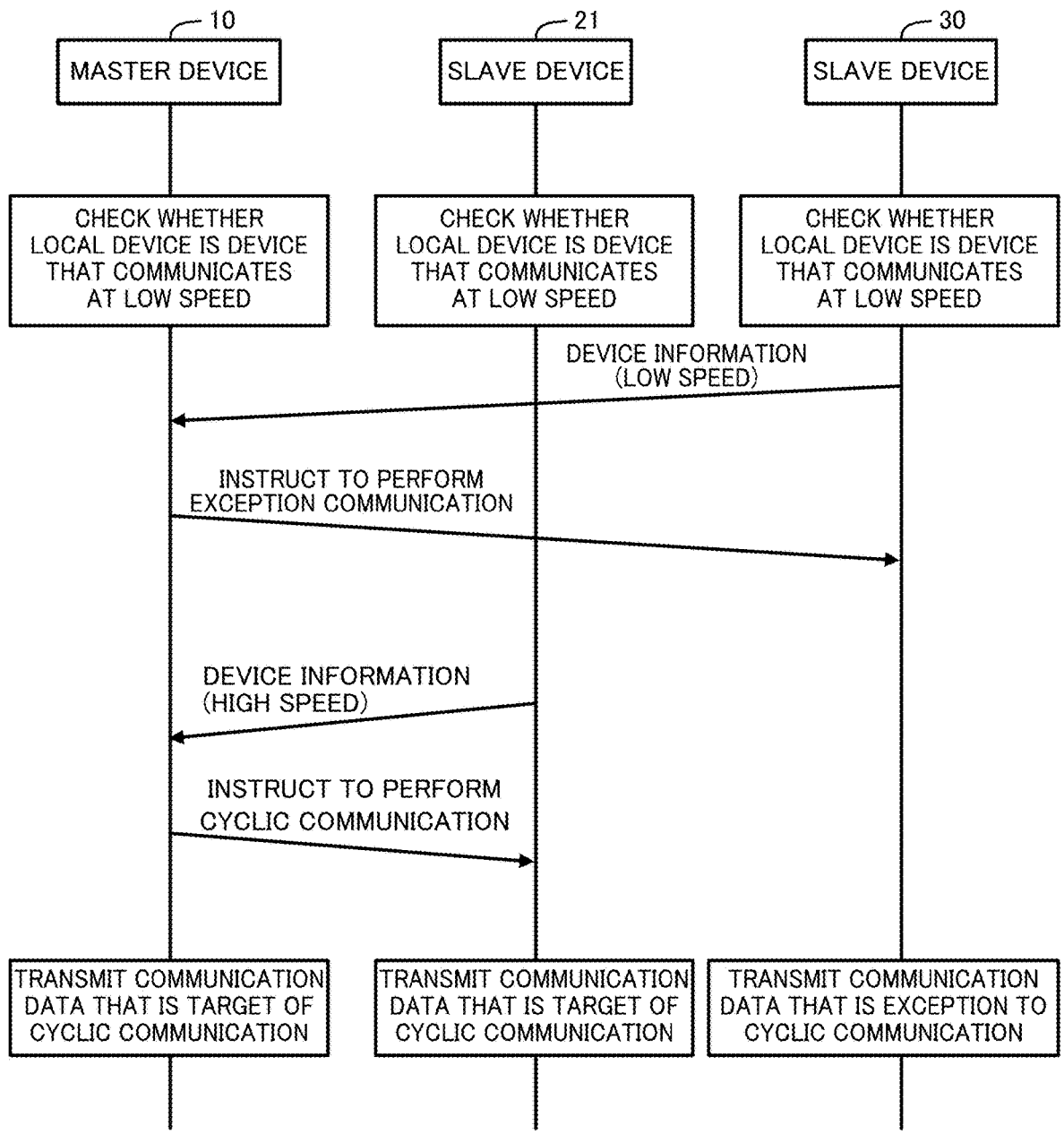
FIG. 18 illustrates an example of communication processing according to a modified example.

Furthermore, although an example is described in which each of the slave devices 21, 22, and 30, when the master device 10 collects device information, transmits device information and determines whether the local device is to perform the cyclic communication or is to perform the exception communication, this is not limiting. For example, as illustrated in FIG. 18, the master device 10 may instruct each slave device to, depending on collected device information, perform the cyclic communication or perform the exception communication, and each slave device may perform the cyclic communication or the exception communication in accordance with this instruction. Further, when the collected device information indicates that one of the slave devices communicates at a low speed, the master device 10 may instruct the one slave device to transmit communication data that includes target information indicating that the communication data is the exception to the cyclic communication. This instruction may be achieved using a frame 60 in the format illustrated in FIG. 9.

FIG. 18 illustrates an example in which the master device 10 and the slave device 30 do not perform mutual exception communication with each other and the master device 10 transmits to all slave devices communication data that is the target of the cyclic communication. In the aforementioned embodiment, an example is described in which a pair of communication devices are determined that perform mutual exception communication. However, as illustrated in FIG. 18, the first communication device that communicates at a low speed may transmit communication data that is the target of the exception communication, and the second communication device that receives communication data may treat the communication data as the exception to the cyclic communication and transmit, to the first communication device, communication data that is the target of the cyclic communication.

Furthermore, communication data that is the target of the exception communication may omit the identification information 614. In the case of such communication data, the communication device 40 having received the communication data may process the communication data regardless of the presence or absence of the identification information 614.

Furthermore, the functions of the communication device 40 can be achieved by dedicated hardware or by a normal computer system.

For example, distributing the program P1 to be executed by the processor 401 by storing the program P1 in a non-transitory computer-readable recording medium and then installing the program P1 on a computer can achieve a device for executing the above-described processing. A flexible disk, a compact disc read-only memory (CD-ROM), a digital versatile disc (DVD), and a magneto-optical (MO) disc are conceivable as examples of such a recording medium.

Furthermore, the program P1 may be stored in a disk device included in a server device on a communication network such as the Internet and may be downloaded onto a computer, for example, by superimposing the program P1 on a carrier wave.

Furthermore, the above-described processing can also be achieved by starting and executing the program P1 while transferring the program P1 through the communication network.

Furthermore, the above-described processing can also be achieved by executing all or a portion of the program P1 on the server device and by executing, using the computer, a program while transmitting and receiving information relating to the processing via the communication network.

In the case where the above-described functions are implemented by an operating system (OS) by allotment to the OS or are implemented by cooperation between the OS and an application, for example, storage and distribution on the medium of only portions of the program P1 other than a portion of the program P1 executed by the OS is permissible. Alternatively, such portions of the program P1 may be downloaded to a computer.

Furthermore, means for achieving the functions of the communication device 40 is not limited to software, and a part of or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for operation of multiple communication devices having different communication performances.

REFERENCE SIGNS LIST

1000 Communication system
10 Master device
21, 22, 30 Slave device
40 Communication device
41 Cyclic memory
42 Communication interface
43 Reception processor
431 Received data analyzer
432 Receive buffer
44 Transmission processor
441 Transmit data generator
442 Transmit buffer
401 Processor
402 Main storage
403 Auxiliary storage
404 Inputter
405 Outputter
406 Communicator
50 Communication network
60 Frame
61 Header part
611 Destination address
612 Transmission source address
613 Frame type information
614 Identification information
615 Target information
62 Data part
621 Instruction information
622 Device information
62 Footer part
A10, A21, A22, A30 Storage region
P1 Program

The invention claimed is:

1. A communication system comprising a first communication device and a second communication device that are to perform, at predetermined periods, communication for sharing storage data stored in a storage of each of the first communication device and the second communication device, wherein
the first communication device transmits communication data that includes (i) identification information distinguishing a period relating to the communication data from other periods before and after the period and (ii) target information indicating whether the communication data is a target that is to be communicated by the communication at the predetermined periods or is an exception to be excluded from being the target, and
the second communication device receives the communication data, and
discards the communication data when (i) the target information included in the received communication data indicates that the communication data is the target and (ii) the period indicated by the identification information included in the communication data is different from a current period, and
processes the communication data when the target information included in the communication data indicates that the communication data is the exception even when the period indicated by the identification information included in the communication data is different from the current period,
wherein the first communication device, when communicating at a lower speed than a speed of a third communication device, transmits the communication data that includes the target information indicating that the communication data is the exception.

2. The communication system according to claim 1, wherein the first communication device, when communicating by software processing, transmits the communication data that includes the target information indicating that the communication data is the exception.

3. The communication system according to claim 1 wherein
the communication system includes the first communication device, the second communication device, and the third communication device.

4. The communication system according to claim 3, wherein
the second communication device collects device information relating to the first communication device, and instructs the first communication device to transmit, when the collected device information indicates that the first communication device communicates at the lower speed than the speed of the third communication device, the communication data that includes the target information indicating that the communication data is the exception, and
the first communication device transmits, in accordance with an instruction from the second communication device, the communication data that includes the target information indicating that the communication data is the exception.

5. The communication system according to claim 1, wherein the first communication device transmits, in response to notification from the second communication device, the communication data that includes the target information indicating that the communication data is the exception.

6. The communication system according to claim 5, wherein the second communication device sends, to the first communication device, notification that the second communication device communicates by software processing.

7. The communication system according to claim 5 wherein
the communication system includes the first communication device, the second communication device, and a fourth communication device, and
the second communication device sends, to the first communication device, notification that the second communication device communicates at a lower speed than a speed of the fourth communication device.

8. The communication system according to claim 1, wherein the communication data is a frame that includes a header, and the header includes the target information.

9. A communication device to perform, at predetermined periods, communication for sharing storage data stored in a storage with another communication device, the communication device comprising:
a communication interface to receive, from the another communication device, communication data transmitted by the communication, the communication data including (i) identification information distinguishing a period relating to the communication data from other periods before and after the period and (ii) target information indicating whether the communication data is a target that is to be communicated by the communication at the predetermined periods or is an exception to be excluded from being the target; and a processor to discard the communication data when (i) the target information included in the communication data indicates that the communication data is the target and (ii) the period indicated by the identification information included in the communication data is different from a current period, and process the communication data when the target information included in the communication data indicates that the communication data is the exception even when the period indicated by the identification information included in the communication data is different from the current period, wherein the communication device, when communicating at a lower speed than a speed of a third communication device, transmits the communication data that includes the target information indicating that the communication data is the exception.

10. The communication device according to claim 9, wherein the communication device, when communicating by software processing, transmits the communication data that includes the target information indicating that the communication data is the exception.

11. The communication device according to claim 9, wherein the communication data is a frame that includes a header, and the header includes the target information.

12. A non-transitory recording medium storing a program causing a computer for performing communication with a communication device at predetermined periods to execute:

receiving, from the communication device, data that includes (i) identification information distinguishing a period relating to the data from other periods before and after the period and (ii) target information indicating whether the data is a target that is to be communicated by the communication at the predetermined periods or is an exception to be excluded from being the target; and discarding the data when (i) the target information included in the data indicates that the data is the target and (ii) the period indicated by the identification information included in the data is different from a current period, and processing the data when the target information included in the data indicates that the data is the exception even when the period indicated by the identification information included in the data is different from the current period, wherein the communication device, when communicating at a lower speed than a speed of a third communication device, transmits the communication data that includes the target information indicating that the communication data is the exception.

13. The non-transitory recording medium according to claim 12, wherein the data is a frame that includes a header, and the header includes the target information.

14. A communication method for performing communication at predetermined periods, the communication method comprising:

receiving data that includes (i) identification information distinguishing a period relating to the data from other periods before and after the period and (ii) target information indicating whether the data is a target that is to be communicated by the communication at the predetermined periods or is an exception to be excluded from being the target; and discarding the data when (i) the target information included in the data indicates that the data is the target and (ii) the period indicated by the identification information included in the data is different from a current period, and processing the data when the target information included in the data indicates that the data is the exception even when the period indicated by the identification information included in the data is different from the current period, wherein when communicating at a lower speed than a speed of a communication device different from a transmitting communication device, transmitting the data that includes the target information indicating that the data is the exception.

15. The communication method according to claim 14, wherein the data is a frame that includes a header, and the header includes the target information.

* * * * *